US007783283B2

(12) United States Patent
Kuusinen et al.

(10) Patent No.: US 7,783,283 B2
(45) Date of Patent: Aug. 24, 2010

(54) METHOD AND DEVICE FOR HANDLING MISSED CALLS IN A MOBILE COMMUNICATIONS ENVIRONMENT

(75) Inventors: Jarmo Kuusinen, Jyväskylä (FI); Ari Tourunen, Espoo (FI); Minna Asikainen, Tampere (FI)

(73) Assignee: Nokia Corporation, Espoo (FI)

( * ) Notice: Subject to any disclaimer, the term of this patent is extended or adjusted under 35 U.S.C. 154(b) by 1750 days.

(21) Appl. No.: 10/937,534

(22) Filed: Sep. 8, 2004

(65) Prior Publication Data

US 2005/0059384 A1  Mar. 17, 2005

(30) Foreign Application Priority Data

Sep. 12, 2003  (WO) .................... PCT/IB03/03895

(51) Int. Cl.
*H04M 11/10* (2006.01)

(52) U.S. Cl. .................... 455/412.2; 455/413

(58) Field of Classification Search ............ 455/414.1, 455/422.1, 518, 519, 416; 370/261, 262, 370/158

See application file for complete search history.

(56) References Cited

U.S. PATENT DOCUMENTS

| 6,324,265 | B1 | 11/2001 | Christie, IV et al. | 379/88.23 |
| 7,079,837 | B1* | 7/2006 | Sherman et al. | 455/415 |
| 2002/0039407 | A1 | 4/2002 | O'Donovan et al. | 379/67.1 |
| 2002/0094811 | A1 | 7/2002 | Bright et al. | 455/433 |
| 2003/0040280 | A1* | 2/2003 | Koskelainen | 455/67.1 |
| 2004/0110489 | A1* | 6/2004 | Murri et al. | 455/412.1 |
| 2004/0120505 | A1* | 6/2004 | Kotzin et al. | 379/373.01 |
| 2004/0203651 | A1* | 10/2004 | Qu et al. | 455/414.1 |
| 2004/0203977 | A1* | 10/2004 | Kennedy | 455/518 |
| 2004/0253957 | A1* | 12/2004 | Pelaez et al. | 455/445 |
| 2005/0037739 | A1* | 2/2005 | Zhong | 455/413 |
| 2005/0047561 | A1* | 3/2005 | Seiferth | 379/88.22 |

FOREIGN PATENT DOCUMENTS

WO  WO 03/103262 A1  12/2003

* cited by examiner

*Primary Examiner*—Creighton Smith
(74) *Attorney, Agent, or Firm*—Ditthavong Mori & Steiner, P.C.

(57) ABSTRACT

A mobile terminal comprises a registering functionality which is adapted to register terminal-based information about one or more missed call events which are not accepted by a user. Network-based information about one or more missed call events or voice messages registered by a PLMN to which the mobile terminal is subscribed is received. The network-based information is combined with the terminal-based information such that the mobile terminal is able to present the combined information to a user. Moreover, a method is provided for registering information about missed call events in a PLMN comprising at least an IP Multimedia Subsystem (IMS) which is responsible for packet data services. An incoming call received by the IMS from a calling terminal originally destined to a called mobile terminal is redirected in accordance with Filter Criteria (FC) to the IMS and information about a missed call event in accordance with the incoming call is registered by the IMS.

25 Claims, 6 Drawing Sheets

```
01  <call_event_log>
02      <event>
03          <from>sip:MT1@domain.com</from>
04          <date>12.12.2002</date>
05          <time>23:59</time>
06          <call-id>asdf-3dr324@domain.com</call-id>
07          <type>call</type>
08          <fwd-url>MT2.voicemail@server.com:voicemail=true</fwd-url>
09          <subject>Tommorrow's party!!!</subject>
10      </event>
11      <event>
12          <from>sip:john.doe@isp.com</from>
13          <date>12.12.2002</date>
14          <time>19:55</time>
15          <call-id>qwer-23234@isp.com</call-id>
16          <type>group call</type>
17          <subject>What's up!?!?!</subject>
18      </event>
19  </call_event_log>
```

Fig. 6

METHOD AND DEVICE FOR HANDLING MISSED CALLS IN A MOBILE COMMUNICATIONS ENVIRONMENT

CROSS-REFERENCE TO RELATED APPLICATION

This application claims priority from International Application Number PCT/IB2003/003895 filed Sep. 12, 2003.

BACKGROUND OF THE INVENTION

1. Technical Field

The present invention relates to handling and registering of information about missed call events in a mobile communications environment. In particular, the present invention relates to an Internet multimedia environment of mobile communications.

2. Discussion of Related Art

In view of usability and functionality today's mobile communication systems are still under development. Disadvantages became continuously apparent to users and developers of mobile communication systems. The field of the present invention is associated with the current handling of missed calls, i.e. calls directed to mobile terminals which are not accepted by users of the terminals due to all possible reasons including out of operation mode of the mobile terminals. Today's typical Public Mobile Communications Networks (PLMN) provide digital voice mailbox recorders as a standard feature. Calls to a mobile terminal can be routed to the digital voice mailbox recorders in case the mobile terminals are switched off or in case a user has predefined call routing rules. That means for instance all incoming calls are routed to an appropriate digital voice mailbox recorder within a certain predefined period of time, when the mobile terminal is present in a certain geographic region, when the user currently holds a presently active communication connection. The enumeration may be continued.

Principally, two different base situations have to be considered for more detailed illustration of the background of the present invention. In the first situation, an example mobile terminal in question shall be in operation, whereas the mobile terminal shall be out of operation in the second situation.

The mobile terminal in operation is independently able to log all incoming call indications signalized by the PLMN to the terminal device. On receiving a call attempt by the PLMN allowance is made for the user for accepting, ignoring and rejecting the attempt for establishment of a communication connection. Accordingly, the mobile terminal is able to log all call attempts in conjunction with information about the user action as a consequence of the signalizing (sometimes called "signaling"). That means for instance that one or more dedicated applications operated on the terminal device are adapted to log incoming call indications and user events occurring as a consequence of the call indications. Conventionally, the resulting information is moreover managed and stored in a sorted way by the one or more dedicated applications, such that the user may be for example allowed to recall information about all previously accepted calls and all previously missed or rejected calls for being displayed and employed. Further conventionally, such presentations of information are normally supported and obtained by a (graphical) user interface operated on the terminal device. The user interface is principally adapted for displaying information to a user, the presentation of which is operable with key input of the user.

Moreover, the terminal device receiving an incoming call indication which is not accepted by the user, may be configured to route the call to a digital voice mailbox system, which allows a caller to leave a voice message for the user of the terminal device. In case the caller has left a voice message on the voice mailbox system, the user of the terminal is normally informed about the new available voice message by a network message such as a Short Message (SM) provided by the Short Message Service (SMS) available in the Global System for Mobile communications (GSM) or Universal Mobile Telecommunications System (UMTS). The disadvantage of the described state of the art information about voice messages is that on the one hand the mobile terminal logs all incoming call events and on the other side voice messages are prompted to a user of the mobile terminal by network messages. Applications operated on the mobile terminal which are responsible for logging of call events and network messages, respectively, are completely separate such that the information available by the applications is not brought together although the combination of this information would be favorable for the usability of the mobile terminal.

The mobile terminal that is out of operation is apparently not able to receive any signals, indications, messages etc. from a public land mobile network. Correspondingly, incoming call indications can not be routed to the mobile terminal such that normally the calls directed to the mobile terminal out of operation are rerouted automatically to a voice mailbox system of the PLMN. In turn, in case the caller has left a voice message on the voice mailbox system, the user of the terminal is normally informed about the new available voice message by a network message. The use of network messages for prompting a user about voice messages on a voice mailbox system is beneficial in this case because network messages such as short messages operated by the SMS are stored by the PLMN until the mobile terminal returns into operation. There are also solutions available which overcome the problem about missed calls the callers of which have not left voice messages. Normally, such missed calls are not logged because the mobile terminal is out of operation and hence not able to respond thereto and the PLMN does not support any logging function dedicated therefor.

US 20020094811 discloses a method which allows logging of missed calls by the PLMN and teaches to use network messages such as Mobile-Terminating Forward Short Messages (MT-FSM) to inform the user of the mobile terminal after switching on about the missed calls analogous to the informing about voice messages left by callers during out of operation of the mobile terminal. Nevertheless, the information conveyed to the terminal device via network messages is not combined with information acquired by logging functionality of the mobile terminal obtained in an operational state although the combination of this information is favorable for the usability of the mobile terminal It is apparent to those skilled in the art that the presently employed methods for indicating missed calls and voice mailbox messages to a user lack in usability since the logged information is not composed adequately to be presented in a uniform presentation which guarantees usability.

DISCLOSURE OF INVENTION

The object of the invention is to improve usability of a mobile terminal in conjunction with a uniform presentation and handling of information about call events comprising especially information about missed call events and information about voice messages left on a voice mailbox system. The uniform presentation and handling of the information about call events shall be independent of the operational state of the mobile terminal.

Advantageously, the present invention ensures that the missed call log implemented in a portable terminal capable for mobile communications contains a complete history about missed calls including information about missed call events in case the portable terminal is activated and registers for itself and in case the portable terminal is out of operation and network-based registering is performed.

Moreover, the present invention provides a complete set of information about missed call events comprising a caller identifier, time and date of the missed call, information whether a voice message has been left on a voice mailbox system and the like. The user of the terminal may employ one or several parts of the information for further processing. Additionally, the invention allows integration of information about a present available voice message into the information about a missed call event which improves the intelligibility and usability of the missed call presentation. Context sensitive options may be realized as a consequence of this additional information, a semi-automated voice message reproduction is realizable and is improved significantly.

According to a first aspect of the invention, a method for handling information about missed call events and information about voice messages by a mobile terminal is provided. The mobile terminal comprises a registering functionality which is adapted to register terminal-based information about one or more missed call events, i.e. incoming calls which are not accepted by a user of the mobile terminal. The method comprises further receiving of network-based information about one or more missed call events registered by a PLMN to which the mobile terminal is subscribed. The network-based information about one or more missed call events may comprise additionally network-based information about one or more voice messages. Such network-based information occurs when the mobile terminal is not available or not reachable in the PLMN due to the fact that for example the mobile terminal is switched off or a call redirection is set. The network-based information is combined with the terminal-based information such that the mobile terminal is able to present the combined information to a user.

Consequently, the registering functionality of the mobile terminal is capable to register and present missed call events to its user independent from its operational state, i.e. for instance missed call events in accordance with calls which are not accepted by the user and missed call events in accordance with calls which are not even routed thereto. The information about missed call events may comprise for instance information about the originator who has left the message, time, date, eventually subject of the call, etc.

According to an embodiment of the invention, the presentation of the combined information is advantageous for the user since the presentation depicts a complete event history relating to all missed call events independent from the operational state of the terminal device.

According to an embodiment of the invention, the method further allows instructing a voice mailbox system that is part of the PLMN to reproduce voice messages stored thereon. That means, voice messages left for the user of the mobile terminal may not be stored locally in the mobile terminal, since voice messages require storage capacity which may not be implementable therein. As aforestated, the mobile terminal downloads from the PLMN and saves locally the information identifying the message designated above as information about missed call events. The actual voice message is stored only in the PLMN and when the users want to listen to the one or more voice messages the one or more voice messages are streamed to the mobile terminal and reproduced thereby to the user.

According to an embodiment of the invention, the method alternatively allows instructing the voice mailbox system to reproduce a user-selected voice message. The user-selected voice message is defined by user selection operable with the mobile terminal, i.e. with input means of the mobile terminal, which are provided for user-operation.

According to an embodiment of the invention, the method in particular comprises downloading of at least one voice message from the voice mailbox system and storing locally the downloaded voice message on the mobile terminal. Moreover, the mobile terminal comprises a voice message reproduction functionality that is adapted to reproduce voice messages and in particular to reproduce downloaded and stored voice messages.

According to an embodiment of the invention, a designation of a caller is resolved on the basis of a caller identifier that is comprised in the information about missed call events. A directory such as a telephone directory, a contact directory, a contact list etc defined and implemented in the mobile terminal associates a plurality of designations such as names with a plurality of caller identifiers such as telephone numbers. The resolving operation is performed in accordance with the defined association between designations and caller identifiers.

According to an embodiment of the invention, the combining of the information about missed call events and the information about voice messages is obtained by comparing call identifiers comprised thereby.

According to an embodiment of the invention, the mobile terminal receives the network-based information about missed call events from a voice mailbox service that is part of the PLMN.

According to an embodiment of the invention, the mobile terminal receives the network-based information about missed call events in the form of XML-coded data. Alternatively, the network-based information about missed call events may be represented in another suitable coding such as a proprietary data coding.

According to an embodiment of the invention, data communications between mobile terminals and the PLMN is based on a Session Initiation Protocol (SIP), in particular adapted to the communication of network-based information about missed call events. It shall be noted that SIP is employed for session control in an IP Multimedia Subsystem (IMS), whereas data transmission is operated in conjunction with other transmission protocols adapted thereto. For instance streaming of content to the mobile terminal may use Real Time Protocol (RTP) over User Datagram Protocol/Internet Protocol (UDP/IP).

According to a second aspect of the invention, a method for registering information about missed call events in a PLMN is provided that comprises at least an IP Multimedia Subsystem (IMS) which is responsible for packet data services. An incoming call is received by the IMS from a calling terminal originally destined to a called mobile terminal. The incoming call is redirected in accordance with Filter Criteria (FC) to the IMS and information about a missed call event in accordance with the incoming call is registered by the IMS. The at least registered information about the missed call event is stored by the IMS.

According to an embodiment of the invention, the IMS includes one or more functional entities comprising Call State Control Functions (CSCF), in particular at least a serving Call State Control Function (S-CSCF).

According to an embodiment of the invention, a voice message dictated or spoken by a caller of the calling terminal is recorded and the recorded voice message is stored by a voice mailbox service (VAS) in conjunction with information about the missed call event corresponding to the recorded voice message. The voice mailbox service is part of the PLMN. This information the missed call event corresponding to the recorded voice message may comprise for instance information about date, time of the missed call event (i.e. of the unsuccessful call attempt), number or session initiation protocol universal resource indicator (SIP URI) of the caller, subject provided by the caller, type of the call etc.

According to an embodiment of the invention, a database is associated with the voice mailbox service. The database associated with the voice mailbox service may also be employed to store voice messages that are associated with information about missed call events. Moreover, the IMS may delegate the storing of the registered information about missed call events to the voice mailbox service and hence to the database, respectively.

According to an embodiment of the invention, the IMS and a functional entity (i.e. a CSCF) comprised in the IMS is aware of an availability of the originally destined mobile terminal, respectively In particular, the S-CSCF is aware of the availability. The registered information is transmitted to the originally destined mobile terminal when the originally destined mobile terminal is present in the PLMN.

According to an embodiment of the invention, the PLMN further includes an availability function that is responsible to inform 3rd party services subscribed thereto about an availability state of the called mobile terminal, i.e. to inform about changes in the availability state. A change of the availability state occurs for example in case the originally destined mobile terminal is switched on or off, leaves or enters the coverage area of the PLMN etc.

According to an embodiment of the invention, the voice mailbox service is subscribed to the availability function that indicates the availability of the originally destined mobile terminal thereto.

According to an embodiment of the invention, the registered information is transmitted as XML-coded data to the originally destined mobile terminal.

According to an embodiment of the invention, data communications with the originally destined mobile terminal are based on SIP, in particular adapted to the communication of network-based information about missed call events.

According to a further aspect of the invention, a computer program product for executing a method for registering and handling of information about missed call events is provided. The computer program product comprises program code sections for carrying out the steps of the method of an aforementioned embodiment of the invention, when the program is run on a computer, a terminal, a network device, a mobile terminal, a mobile communication enabled terminal or an application specific integrated circuit. Alternatively, an Application Specific Integrated Circuit (ASIC) may implement one or more instructions that are adapted to realize the aforementioned steps of the method of an aforementioned embodiment of the invention, i.e. equivalent with the aforementioned computer program product.

According to another aspect of the invention, a computer program product is provided, which comprises program code sections stored on a machine-readable medium for carrying out the steps of the method of an aforementioned embodiment of the invention, when the computer program product is run on a computer, a terminal, a network device, a mobile terminal, or a mobile communication enabled terminal.

According to yet another aspect of the invention, a computer data signal embodied in a carrier wave and representing instructions is provided which when executed by a processor causes the steps of the method of an aforementioned embodiment of the invention to be carried out.

According to still another aspect of the invention, a mobile terminal is provided. The mobile terminal is adapted to handle information about missed call events and comprises a registering functionality for at least registering terminal-based information about one or more missed call events. The registering functionality is further adapted to handle network-based information about one or more missed call events. The registering functionality receives the network-based information registered by a PLMN to which the mobile terminal is subscribed. Afterwards the registering functionality serves for combining the network-based information with the terminal-based information and finally the registering functionality is provided for presentation of the combined information to a user of the mobile terminal. The network-based information about one or more missed call events may comprise network-based information about one or more voice messages.

According to an embodiment of the invention, the mobile terminal is adapted to perform any of the operations of the method of an aforementioned embodiment.

According to another aspect of the invention, a PLMN is provided. The PLMN is adapted to register information about missed call events and comprises an IP Multimedia Subsystem (IMS). The IMS is adapted to receive an incoming call from a calling terminal originally destined to a called mobile terminal and to redirect the incoming call in accordance with filter criteria. Further, the IMS is adapted to register information about a missed call event in accordance with the incoming call and to store the registered information.

According to an embodiment of the invention, the PLMN is adapted to perform any of the operations of the method of an aforementioned embodiment.

Still other objects and advantages of the present invention will become readily apparent to those skilled in the art from the following detailed description in which reference is made to embodiments of the invention simply by the way of illustration. As will be realized the invention is capable of other and different embodiments and its several details are capable of modification in various without departing from the scope of the invention, which is only limited by the appended claims. The drawings and the description are to be regarded as illustrative in nature and not as restrictive.

The embodiments described in detail below are directed to the registration of missed call events and/or the reception/storage of voice messages associated therewith. At least the reception/storage of voice messages is typically performed by a voice mailbox service being part of the PLMN. Enhanced mailbox services are not limited to voice message reception and storage. Such voice mailbox services may also be capable to handle facsimile messages, email messages, video calls, video messages, multimedia messages and the like. Those skilled in the art will appreciate that the handling of such messages is performed analogously to the described handling of missed (voice) call events and voice messages.

BRIEF DESCRIPTION OF THE DRAWINGS

FIGS. 1(a-h) illustrates example user interface depictions according to an embodiment of the invention;

FIGS. 5(a-b) illustrates operational sequence charts which relates to recalling of voice messages according to embodiments of the invention.

BEST MODE FOR CARRYING OUT THE INVENTION

In order to provide clear and comprehensive reference numerals the operational steps, which are shown in FIG. 2 to FIG. 5 and which are originally numbered beginning with number one in each operational sequence chart, are denoted in conjunction with the current number of the corresponding figure. That means, operation 1: INVITE shown in FIG. 2 will be referenced by the reference numeral 2.1, operation 1: REGISTER shown in FIG. 3a will be referenced by the reference numeral 3a.1 and so on.

The term mobile terminal used in the present invention shall apply particularly to any portable terminal device which is capable of mobile communications with public land mobile networks of any standard such as the global system for mobile communications (GSM), universal telecommunications system (UMTS), code division multiple access (CDMA) based systems and the like. In the following, depictions of user interface representations will be described in detail. It should be understood that the user interface representations described with reference to FIG. 1(a) to FIG. 1(h) represent a selection of user interface representations that is part of a plurality of user interface representations which in turn represent in summary the user interface of the mobile terminal. The user interface is operated on the mobile terminal to allow the user of the mobile terminal operating, configuring, and employing functions thereof.

Figure 1:
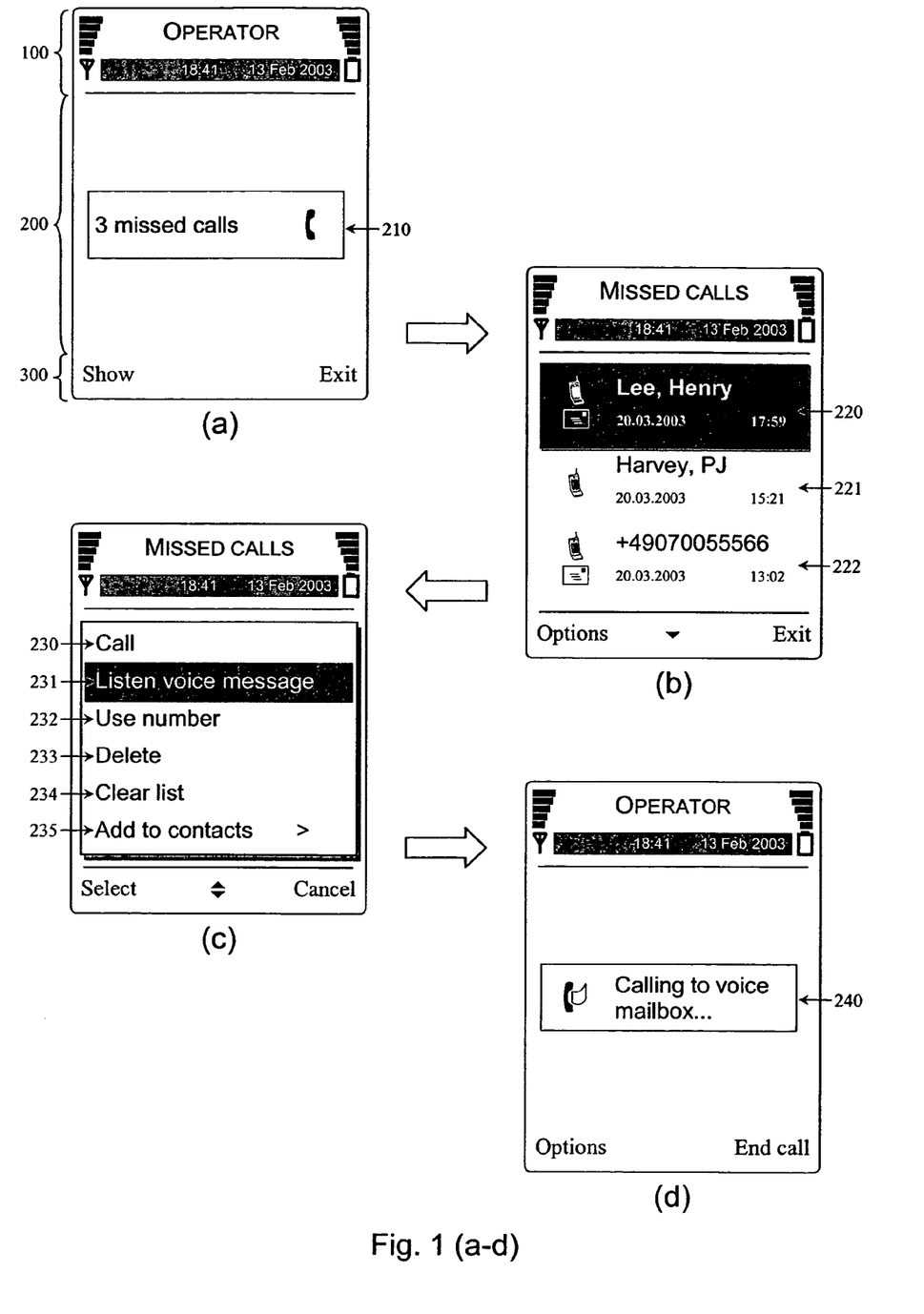

User Interface for Handling Information about Missed Call Events and Voice Messages FIGS. 1(a-h) illustrate example user interface depictions according to an embodiment of the invention, on the basis of which the presentation of information about call events as defined above is performed to provide improved usability to a user of the terminal device. The illustrated user interface depictions may be part of the user interface presentation that allows a user operating functionality of the terminal device by selecting an appropriate user interface depiction and inputting information operable with inputting means provided by the terminal device therefor.

The user interface representations are structured into independent user interface regions: a first region 100 comprising status information about the operational mode of the mobile terminal and/or the current user interface presentation, a second region 200 comprising user interface presentations of the user interface and the third region 300 comprising context dependent functions operable with input means of the mobile terminal such as a keypad especially an ITU-T keypad.

Referring to FIG. 1(a) the user interface representation may relate to an informational notification 210 of the mobile terminal operating the user interface. For instance, the user interface representation of FIG. 1(a) may be presented to the user after putting the mobile terminal into operation. The informational notification 210 indicates to the user of the mobile terminal that 3 incoming call events have been registered but missed by the user, for example because the terminal device was out of operation during the corresponding incoming call events. Alternatively, the same informational notification 210 may be presented to the user of the mobile terminal in case he has not accepted the incoming call events when the mobile terminal was in operation, for example because the user had not taken the mobile terminal with him or the user was unwilling to accept the incoming call event.

Context dependent functions shown to the user allows the user to ignore the current user interface presentation by selecting an "exit" function and alternatively, entering a user interface presentation by selecting a "show" function to display detailed information about the registered missed call events indicated by the notification information.

Referring to FIG. 1(b), the user has selected the "show" function for detailed information about the registered missed call events. The information about the missed call events may be organized in a missed call list, where each entry of the missed call list relates to information about one certain missed call event. The information about one missed call event may comprise but is not limited to information about the caller such as a name, a designation or a subscriber identifier, information about the date and/or time of the incoming call event and information about an optional voice message that has been left possibly on a voice mailbox system by the caller. Herein as an example, three missed call events relate to attempts for establishment of a call by the caller "Lee, Henry" 220 dated on Mar. $20^{th}$, 2003 at 17:59 hrs; by a caller "Harvey, PJ" 221, dated on Mar. $20^{th}$, 2003 at 15:21 hrs; and by a caller "+49070055566" 222, dated on Mar. $20^{th}$, 2003 at 13:02 hrs. The left-hand side positioned symbols indicate moreover that the caller "Lee, Henry" and the caller "+49070055566" have left voice messages on the voice mailbox system for being recalled, whereas the caller "Harvey, PJ" has not left any voice message thereon. The present invention may be implemented on the side of the PLMN in the IMS. Conventionally, a Session Initiation Protocol (SIP) Uniform Resource Indicator (URI) is assigned to each user by the IMS and functional entities thereof, respectively. The SIP URI may be provided and used for addressing purposes and can be also shown in the presentation illustrated above.

Conventionally, the network subscriber identifier (telephone number; Integrated Services Digital Network (ISDN) number, SIP URI, etc) of the calling mobile terminal is conveyed to the called mobile terminal during incoming call indication. This feature is known as Calling Line Identification (CLI) or Calling Line Identification Presentation (CLIP). On the basis of the calling line identification the terminal device receiving an incoming call indication is able to resolve a name or designation assigned to the subscriber identifier, e.g. calling line identification of the calling mobile terminal by employing stored contact information of an electronic contact manager, telephone directory and the like for resolution. Depending on whether the called mobile terminal can identify an assignment of a received calling line identification corresponding to the subscriber identifier of the caller and user-predefined name and designation, respectively, the name/designation is presented to the user, otherwise the calling line identification presentation is presented.

In the context of the detailed information about missed calls, the user is allowed to leave the current user interface presentation by selecting a context dependent function "exit" as shown in FIG. 1(b). Alternatively, the user is allowed to enter a user interface representation that presents further functions relating to a subsequent handling of the missed call events by selecting a context depended function "options". The functions available under such options for a subsequent selection by the user and handling by the device will effect one of the missed call events. The user pre-selects one of the presented list entries operable with the input means of the mobile terminal. Herein as example, the list entry relating to the missed call event of the caller "Lee, Henry" 220 is pre-selected indicated by the gray-scaled dimmed background.

Alternatively, the context dependent functions shown to the user may contain different menu items for different list entries in the missed call list. The context dependent functions may depend on the pre-selected list entry. For instance, if the caller has left a voice message indicated by the list entry as aforementioned a context dependent function "listen message" may be offered to the user. The context dependent function "listen message" allows the user to immediately retrieve the left voice message, for instance establish a communication connection to the voice mailbox system. This alternative corresponds to a skipping to FIG. 1(d). In case the caller has not left any voice message the context dependent function may be disabled, not available or substituted with another context dependent function.

Referring to FIG. 1(c) the user has selected to enter the user interface representation relating to the functions for subsequent handling of a pre-selected missed call event caused by the caller "Lee, Henry". The illustrated user interface representation shows a list of functions to the user operable with the information about the missed call event caused by the caller "Lee, Henry". As example, the user is allowed to call the caller "Lee, Henry"; to listen to the voice message left on the voice mailbox system by the caller "Lee, Henry"; to use the number being assigned to the caller designation "Lee, Henry"; to delete the current list entry "Lee, Henry" from the missed call list; to clear the total missed call list, to add the current caller "Lee, Henry" to the contacts, the contact manager, the telephone directory etc. managed by the mobile terminal; and the like. The enumeration of functions suitable in conjunction with the list entry "Lee, Henry" shall be understood as not being limited thereto, i.e. further supplementary functions may be added to the presented enumeration of functions. The user is allowed to scroll through the list of functions for pre-selecting one of the functions and to confirm the pre-selected function by selecting a context dependent function "select" provided in the context region 300 of the current user interface representation. Alternatively, the user is also allowed to leave the current user interface representation by selecting a context dependent function "cancel" provided in addition in the context region 310.

Herein as example and with respect to the present invention, the function "listen voice message" shall be pre-selected by the user and the pre-selection shall be confirmed by selecting the select function.

Referring to FIG. 1(d) the user has selected the function "listen voice message" and the user interface presentation notifies to the user that an establishment of a communication connection to the voice mailbox system is initialized that stores the voice message left by the caller "Lee, Henry" thereon.

Referring to FIG. 1(e) the initialization of the establishment of the communication connection to the voice mailbox system is successfully completed such that access to the voice mailbox system is possible. The depicted user interface representation notifies accordingly to the user.

Depending on the capabilities and the implemented functions of the mobile terminal, the recall of voice messages stored on a voice mailbox system may be solved differently. Conventionally, the user of the mobile terminal dials a specific access number to access the voice mailbox system that is associated with the mobile terminal to store voice messages being directed to the user. The voice messages are reproduced by the voice mailbox system to the user after identification with the voice mailbox system. The reproducing may be controlled by dual-tone multi-frequency (DTMF) coded signals operable with a keypad (e.g. an ITU-T keypad) of the mobile terminal. In view of the present example, the voice mailbox system stores currently two voice messages, the voice message of the caller "Lee, Henry" and the voice message of the caller "+49070055566". The conventional procedure of recalling voice messages from the voice mailbox system implies, that the voice mailbox system is accessed by the user via the mobile terminal but the mobile terminal is not capable to control the reproduction of the voice messages. The user is guided through the operation of the voice mailbox system by a computerized voice control mechanism that expects DTMF-coded control signals.

More favorably, the reproducing of a specific voice message is controlled by the mobile terminal. The mobile terminal may instruct the voice mailbox system to reproduce a specific voice message. That means that the mobile terminal instructs the voice mailbox system to reproduce that voice message which is associated with the previous selected list entry of list comprising information about the missed called events. Instructions required for controlling the reproduction of a specific voice message by the voice mailbox system may be conveyed as DTMF-coded signals.

Referring to FIG. 1(f), the established communication connection may be used for transmitting the voice message or the voice messages stored on the voice mailbox system such as described above. The user interface representation illustrated in FIG. 1(f) displays a corresponding status information during reproduction of the voice message(s).

Most favorably, the reproducing of the voice message is performed by the mobile terminal. The mobile terminal establishes a communication connection to the voice mailbox system via which the mobile terminal downloads a specific voice message of the stored voice messages or all stored voice messages. The one or more voice messages are supplied to a voice mailbox application that allows storing, handling and reproducing the downloaded voice messages. This embodiment represents the most favorable solution since once the voice messages are stored in the mobile terminal the voice messages are locally available to the user. A repeated reproduction does not require an establishment of a communication connection to the voice mailbox system once again. Moreover, the voice messages may be associated with the corresponding missed call events such that a simple and fast access of one specific voice message via the corresponding entry in the above explained missed call list is achievable.

The user interface representations depicted in FIG. 1(g) and FIG. 1(h) relate to another aspect of the inventive solution for reproducing voice messages. With reference to FIG. 1(g), the user interface representation informs the user about the download procedure of the voice messages. In accordance with the aforementioned solution the downloaded voice messages are supplied to the voice mailbox application operated on the mobile terminal. Referring to FIG. 1(*h*), a possible user interface representation relating to the operating of the voice mailbox application is shown. The voice message list is displayed to the user that comprises list entries which each relate to one currently stored voice message. The example voice message list shown with reference to FIG. 1(*h*) comprises an entry 250 indicating a voice message of the caller "Lee, Henry"; an entry 252 indicating a voice message of the caller "+49070055566" and an entry 254 indicating a voice message of the caller "Ripper, the Jack". The entry 250 and entry 252, i.e. the voice message of the caller "Lee, Henry"; the voice message of the caller "+49070055566" are marked as new voice messages by marks 251 and 253, respectively, which informs the user of the mobile terminal that these voice messages are new and have not been reproduced up to now.

Those skilled in the art will appreciate that the user interface representations shown in FIG. 1(*a*) to FIG. 1(*h*) and described in detail with reference thereto illustrate a uniform handling of missed call events and allows the user of the mobile terminal implementing the above explained and inventive procedure to manage missed call events in an intuitive and adequate way. The usability of the mobile terminal integrating the above described features is clearly improved against solutions of the state of the art. Especially, the aforementioned procedure for handling missed calls combines all information relating to missed call events which is not possible with present state of the art handling of missed calls events which has been described in detail in the introduction part the present invention.

It shall be expressively indicated that the above-illustrated procedure of handling missed call events accumulates information which may occur during out-of-operation and in-operation of the mobile terminal, respectively.

The technical realization of aforementioned procedure for handling voicemail services and missed call events will become apparent for those skilled in the art when reading the following sections relating to the technical implementation on the terminal side and on the PLMN side. In the following description the implementation of voicemail services and registering of missed call events as aforementioned with respect to the user interface operation of a mobile terminal according to an embodiment of the present invention will be based on third generation (3G) IP Multimedia Subsystem (IMS) implementation which is part of the UMTS standard information about which may be obtained from corresponding standard relevant documents. Those skilled in the art will appreciate that mobile communications systems being based on different standards implement similar or equal features that allow transferring the description given below to those mobile communications system. The present invention shall not be limited to a specific mobile communications system.

Registration of Information about Missed Call Events and Voice Messages

Figure 2:
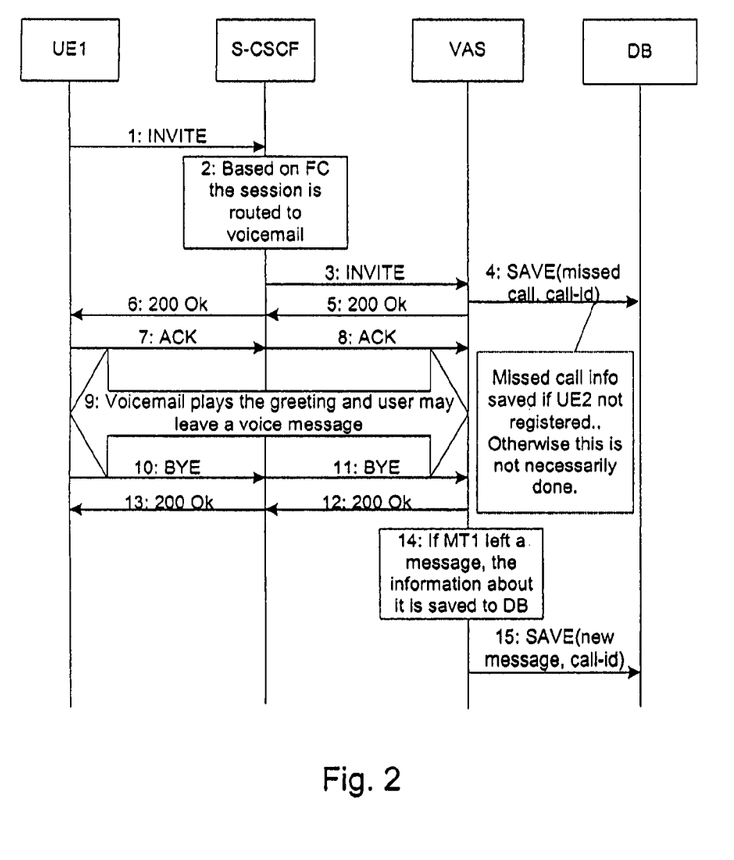
FIG. 2 illustrates an operational sequence chart which enables logging of information about missed call events and voice messages according to an embodiment of the invention.

The operational sequence chart shown in FIG. 2 illustrates an operational sequence according to an embodiment of the present invention which allows to log information about a caller when the incoming call event caused by the caller is not acceptable by a called user such that there is not established a communication connection to the called mobile terminal. The depicted operational sequence comprises a calling terminal UE1, a serving call state control function S-CSCF, a voicemail application server VAS and a database DB. Although the calling terminal is noted as UE1 which is an abbreviation of user equipment 1 normally designating a mobile terminal it shall be understood that calling terminal UE1 may be any terminal capable to call a mobile terminal enabled for mobile communications. Further, it shall be noted that the entities serving call state control function S-CSCF, voicemail application server VAS and database DB may be part of one or more physical network servers being part of the public land mobile network, of which the called mobile terminal is a subscriber mobile terminal. Alternatively, one or more of the aforementioned entities may be one or more designated physical network servers operating one or more corresponding applications providing the required functionality.

The operational sequence shown in FIG. 2 applies to the case in which a call from calling terminal UE1 is redirected to voicemail application server VAS providing voice mailbox services for the called mobile terminal which will be designated in the following as mobile terminal UE2. The decision to redirect a call from calling terminal UE1 to voicemail application server VAS is performed by serving call state control function S-CSCF. Alternatively the redirection of a call from calling terminal UE1 to voicemail application server VAS may be performed by other functional entities such as call state control function (CSCF) entities being part of the IMS. The decision may be based on different redirection criteria. For instance, serving call state control function S-CSCF obtains filter criteria from a home subscriber server HSS. That means basically that the home subscriber server HSS that stores filter criteria FC predefined by the user of called mobile terminal UE2 instructs serving call state control function S-CSCF to redirect calls destined originally to called mobile terminal UE2 to voicemail application server VAS.

Filter criteria FC may define that redirection is to be employed in case mobile terminal UE2 is not registered to or not reachable by the IP multimedia subsystem IMS. Filter criteria FC may be more complex, i.e. for instance may comprise time definitions, caller group definitions etc. This example of redirecting a call to voicemail application server VAS is illustrated in FIG. 2.

In an operation 2.1 calling terminal UE1 transmits an original INVITE request for indicating an incoming call event to serving call state control function S-CSCF. The original INVITE request of operation 2.1 is initially destined for called mobile terminal UE1 to indicate an incoming call event. The INVITE request as well as following data communications are part of the SIP call initiation procedure, SIP dialog, used to set up data communications between the parties. In view of the aforementioned Filter Criteria (FC) and in conjunction with the assumption that called mobile terminal UE2 is not reachable, serving call state control function S-CSCF decides in an operation 2.2 to redirect and forward the call to the voicemail application server, respectively. The redirection is obtained in that serving call state control function S-CSCF forwards in an operation 2.3 the INVITE request to voicemail application server VAS to announce the incoming call event caused by calling terminal UE1 and originally destined to mobile terminal UE2. Afterwards voicemail application server VAS notifies in an operation 2.5 to redirecting serving call state control function S-CSCF of the reception by re-transmitting an OK response which is in an operation 2.6 in turn forwarded to calling terminal UE1 that has originally requested establishment of a communication connection.

After notification of the voicemail application server VAS of the INVITE request redirected by serving call state control function S-CSCF in the operation 2.3 voicemail application server VAS registers the call establishment attempt of calling terminal UE1 destined for mobile terminal UE2 in an operation 2.4. In detail, the illustrated dialogs between the participating entities are performed in a call initiation session employing SIP dialogs which among other things comprises information about subscriber identifier, call time and Call IDentification (call-ID). The call-ID is a standard identifier employed in SIP dialogs. At least a part of this information is registered by the voicemail application server to allow registering information about missed call events.

In an operation 2.7 and 2.8, respectively, calling terminal UE1 transmits and acknowledgement (ACK) to serving call state control function S-CSCF, which is again forwarded to voicemail application server VAS. After conveyance of the acknowledgements a communication connection is established between calling terminal UE1 and voicemail application server VAS. In accordance with the functionality of voicemail application server VAS in an operation 2.9 a predefined announcement is reproduced by voicemail application server VAS and the caller of calling terminal UE1 is allowed to leave a voice message on voicemail application server VAS.

In an operation 2.10 calling terminal UE1 indicates the finishing of the communication connection by transmitting a BYE indication to serving call state control function S-CSCF, which is again forwarded voicemail application server VAS in an operation 2.11. The BYE indication is acknowledged by an OK response re-transmitted from voicemail application server VAS in an operation 2.12 and forwarded in an operation 2.13 to calling terminal UE1.

In operations 2.14 and 2.15 that may be operated in parallel or subsequent to the finalizing of the communication connection, a voice message left by the caller of calling terminal UE1 is stored by voicemail application server VAS in conjunction with information about calling terminal UE1 registered by voicemail application server VAS. As aforementioned, the information about calling terminal UE1 may comprise subscriber identifier, call time and a call identification call-ID of the employed Session Initiation Protocol (SIP) The call identification may be substituted by any other information that is applicable for identifying a call attempt. Further the information may also include subject of the call, type of the call such as a video call, a voice call, a facsimile call, a data call etc.

The information registered in operation 2.4 as well as the information registered in operation 2.14 and the voice message left, respectively, may be stored in a database DB associated with voicemail application server VAS. Correspondingly, the storage operation 2.4 and 2.15 may comprise a database access operated via an appropriate database access protocol such as Structured Query Language (SQL) designated for access to database systems. In case the caller has left a voice message on voicemail application server VAS a double registration of the call is possible because information thereabout is stored in operation 2.4 and in operation 2.15. A neglecting or deleting of the previous registration in conjunction with operation 2.4 is possible when filtering the stored information on the basis of the registered call identification call-ID and calling date and/or time.

The described criteria for redirection and forwarding of a call to called mobile terminal UE2 is based on filter criteria obtained from the home subscriber server HSS. Further, redirection criteria may also be present which lead to redirection and forwarding of a call originally destined to called mobile terminal UE2 to the voicemail application server. Another criterion for redirection may be given in case the called user of mobile terminal UE2 does not accept the incoming call event indicated to him. This criterion may be also called "call forward, no answer". The INVITE request of calling terminal UE1 in operation 2.1 is routed conventionally to called mobile terminal UE2. After a predefined period of time mobile terminal UE2 re-transmits a SIP redirection response to calling terminal UE1. The redirection response comprises an address identifier of voicemail application server VAS, e.g. coded as a Uniform Resource Identifier (URI), such that calling terminal UE1 is instructed to direct an INVITE request to voicemail application server VAS identifiable by the address identifier contained in the response. A further criterion for redirection may be given in case mobile terminal UE2 is busy and not capable of accepting the incoming call. This criterion may be also called "call forward, busy". Analogously, called mobile terminal UE2 receives the INVITE request of calling terminal UE1 and actually responds with an SIP redirection response comparable with the aforementioned SIP redirection response. The SIP redirection responses corresponds to class 3xx responses that comprise in particular class 302 "move temporarily" and class 380 "alternative service" responses.

Additionally, in case of a redirection instructed by called mobile terminal UE2, a registering of information about a missed call event may not have to be performed by the voicemail application server when a voice message is not left. This is because called mobile terminal UE2 recognizes itself the call event as a missed call event when instructing the redirection such that information about the missed call event is registered automatically by the called mobile terminal UE2.

Conclusively, the redirection of the call attempt from calling terminal UE1 to called mobile terminal UE2 may be performed either by serving call state control function S-CSCF e.g. based on filter criteria obtained from the home subscriber server HSS or by called mobile terminal UE2 itself Alternatively, the redirection of the call attempt from calling terminal UE1 to called mobile terminal UE2 may also be performed by another call state control function CSCF of the IMS being part of the PLMN. Correspondingly, different session redirection cases may be operated in different ways. However, in any of the above-explained possible cases the call attempt of calling terminal UE1 is finally redirected to the voicemail application server VAS. On the side of the voicemail application server VAS the previously performed redirection procedure can be neglected. It has to be noted that slight differences occur due to the different redirection responses. In case called mobile terminal UE2 instructs the redirection the call-ID of the SIP dialog between calling terminal UE1 and voicemail application server VAS and the call-ID previously valid during the SIP dialog between calling terminal UE1 and called mobile terminal UE2 differ. That means mobile terminal UE2 can not employ the originally registered SIP call-ID for combining the registered missed call event and the information comprising the SIP call identifier, which is stored by voicemail application server VAS in conjunction with a left voice message. A workaround may be obtained by providing a mechanism that allows conveyance of the call-ID valid for SIP dialogs between calling terminal UE1 and voicemail application server VAS to called mobile terminal UE2. Alternatively, the subscriber identifier (e.g. a subscriber identifier, telephone number, SIP URI etc) may be employed for joining information about a missed call event registered by called mobile terminal UE2 and voice message stored by voicemail application server VAS.

Those skilled in the art will appreciate that the operations and functionality described with regard to the serving call state control function S-CSCF may analogously be supported by other Call State Control Function (CSCF) entities without departing from the scope of the present invention. Moreover Call State Control Function (CSCF) are entities of the IP Multimedia Subsystem (IMS) of a 3GPP mobile communications system. The IMS is responsible for packet data services. Similar or other PLMNs include similar or equal subsystems with one or more functional entities such that the present invention is also applicable thereto.

It should be noted that the presented operational sequence may not comprise all possible and necessary operational steps required for redirecting and forwarding an incoming call from terminal UE1, respectively. For example operations and steps relating to an establishment of required Quality of Service (QoS) are neglected. But the operations presented adequately teach the basic operational sequence such that those skilled in the art are able to appreciate and implement operations required for realizing an embodiment of the present invention.

Whereas the operational sequence illustrated in FIG. 2 relates to the registration of information about missed call events and voice messages, the following operational sequences are directed to acquisition of the registered information and voice messages by the called mobile terminal.

Figure 3A:
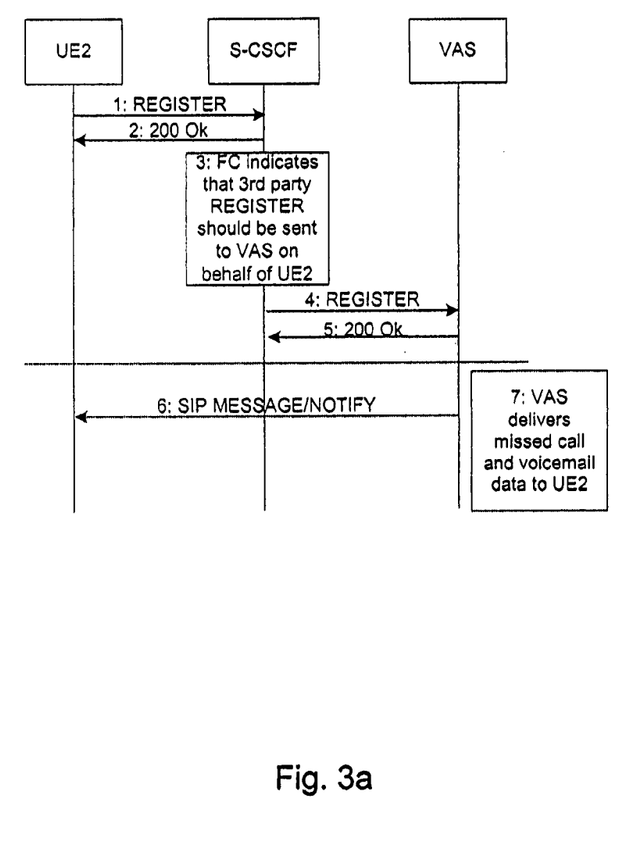
FIG. 3a illustrates an operational sequence chart which enables logging of information about missed call events and voice messages according to an embodiment of the invention according to a first embodiment of the invention.

Conveyance of Registered Information about Missed Call Events and Voice Messages Referring to FIG. 3a a first embodiment according to the present invention for obtaining registered information by mobile terminal UE2 is provided. Two basic conditions have to be discussed when considering the obtaining of registered information by mobile terminal UE2.

In first, mobile terminal UE2 is not registered in or reachable by the public land mobile network comprising serving call state control function S-CSCF and voicemail application server VAS, i.e. mobile terminal UE2 is not registered to serving call state control function S-CSCF. The delivery of registered information is suspended until mobile terminal UE2 gets registered.

In an operation 3a.1 mobile terminal UE2 registers to serving call state control function S-CSCF by transmission of a REGISTER request that is answered in an operation 3a.2 with an OK response. Now serving call state control function S-CSCF is informed about the availability of mobile terminal UE2. In an operation 3a.3 serving call state control function S-CSCF is instructed on basis of predefined filter criteria FC obtained originally from home subscriber server HSS to issue a $3^{rd}$ party registration to voicemail application server VAS. The $3^{rd}$ party registration is performed in operation 3a.4, according to which a REGISTER request relating to mobile terminal UE2 is transmitted to voicemail application server VAS. Consequently, voicemail application server VAS acknowledges the received REGISTER requests in an operation 3a.5 with an OK response. In operations 3a.6 and 3a.7 voicemail application server VAS delivers information about missed calls and/or information about voice messages stored because of the indicated availability of mobile terminal UE2. The information delivery may be performed using e.g. SIP message delivery, subscribe-notify framework message delivery or any applicable data communication delivery procedure.

Figure 3B:
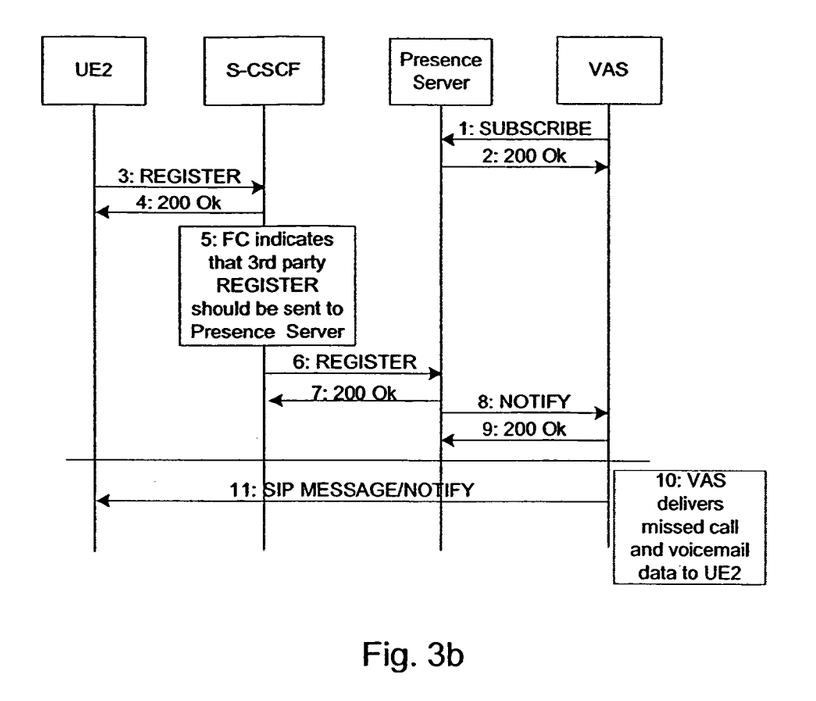
FIG. 3b illustrates an operational sequence chart which enables logging of information about missed call events and voice messages according to an embodiment of the invention according to a second embodiment of the invention.

Depending on the implementation of the public land mobile network to which mobile terminal UE2 is subscribed, a presence/availability server may be available which may be employed for indicating to voicemail application server VAS about registration of mobile terminal UE2 in the PLMN. A corresponding operational sequence according to another embodiment of the present invention is depicted in FIG. 3b. The presence/availability server is responsible to notify any service about the availability, i.e. the availability/reachability of mobile terminal UE2 in the PLMN. Services that wish to be informed about the availability have to subscribe to the presence/availability server.

In an operation 3b.1, voicemail application server VAS subscribes to the availability service of the presence/availability server with a SUBSCRIBE request. In an operation 3b.2, the presence/availability server acknowledges the subscription with an OK response.

The following operations 3b.3 to 3b.5 are analogous to the registering described above with respect to FIG. 3a. In an operation 3b.3 mobile terminal UE2 registers to serving call state control function S-CSCF by transmission of a REGISTER request that is answered in an operation 3b.4 with an OK response. Now serving call state control function S-CSCF is informed about the availability of mobile terminal UE2. In an operation 3b.5 serving call state control function S-CSCF is instructed on basis of filter criteria FC obtained originally from home subscriber server HSS to issue a $3^{rd}$ party registration to the presence/availability server that is responsible to inform dependent services about the availability of mobile terminal UE2. The $3^{rd}$ party registration is performed in operation 3b.6, according to which a REGISTER request relating to mobile terminal UE2 is transmitted to the presence/availability server which then re-transmits an OK response in an operation 3b.7 back to the S-CSCF.

The registering of mobile terminal UE2 at the presence/availability server causes the presence/availability server to indicate the availability of mobile terminal UE2 to all subscribed services including the voice mailbox service operated by voicemail application server (cf. operations 3b.1 and 3b.2). In an operation 3b.8 a NOTIFY message is transmitted from the Presence Server to the voicemail application server VAS that in turn acknowledges the notification with an OK response re-transmitted to the presence/availability server.

In operations 3b.10 and 3b.11 voicemail application server VAS delivers information about missed calls and/or information about voice messages stored because of the indicated availability of mobile terminal UE2. The information delivery may be performed using e.g. SIP message delivery, subscriber-notify framework message delivery or any applicable data communication delivery procedure.

The operational sequences shown in both FIG. 3a and FIG. 3b relate to a registration of mobile terminal UE2 indicating its availability or reachability in the public land mobile network (PLMN). Other conditions are established in case mobile terminal UE2 is available such that registration is not performed. In this case, voicemail application server VAS delivers automatically a notification about a voice message, for example immediately after the voice message has been left by the caller and stored on voicemail application server VAS (and the database, respectively, associated with voicemail application server VAS). Hence, voicemail application server VAS should always be aware of the state of availability or reachability of mobile terminal UE2.

The information or notification about one or more voice messages shall comprise common information such as time, date and specific information such as call-IDs on the basis of which the one or more voice messages may be identified.

The operational sequences that have been described with reference to FIGS. 3a and 3b primarily relate to the registering of the availability/reachability of mobile terminal UE2. The following operational sequences will describe in more detail the delivery of information about missed calls and voice messages as aforementioned with respect to operations 3a.6, 3a.7 and 3b.10, 3b.11, respectively.

Delivery of Information about Missed Calls and Voice Messages

Figure 4A:
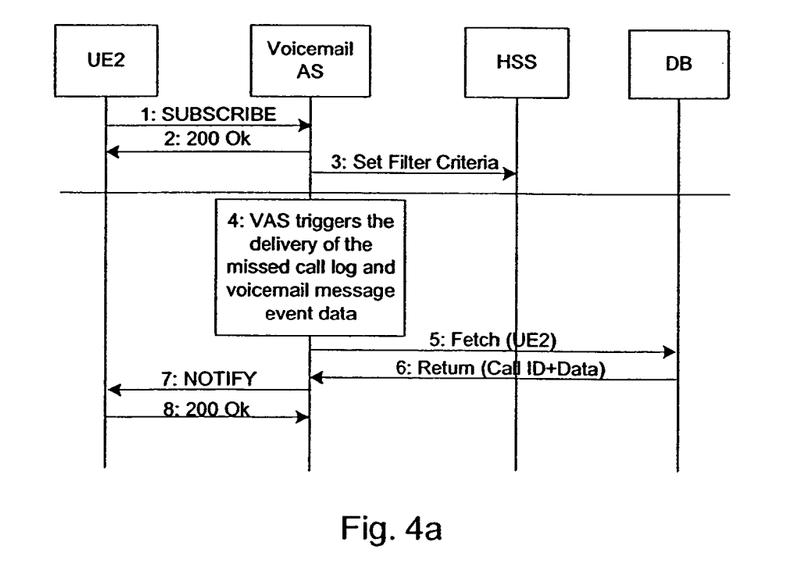
FIG. 4a illustrates a first operational sequence chart that relates to registering of a mobile terminal according to a first embodiment of the invention.

With reference to FIG. 4a, the depicted operational sequence relates on the one hand to a subscription procedure including operations 4a.1 to 4a.3 and on the other hand to a delivery procedure including operations 4a.4 to 4a.8. It is advantageous to implement the information service about missed call events and voice messages as a user-definable service, i.e. the user of mobile terminal UE2 is allowed to configure the information server, especially to activate and deactivate the service. The configuration may be realized as a subscription procedure an embodiment of which is illustrated in FIG. 4a.

In an operation 4a.1 the user of mobile terminal UE2 transmits a SUBSCRIBE request to voicemail application server VAS. The subscribe procedure comprises uploading of a call processing script on the basis of which service logic and filter criteria are obtainable, respectively. The SUBSCRIBE request is acknowledged with an OK response by voicemail application server VAS in an operation 4a.2. Voicemail application server VAS instructs afterwards in an operation 4a.3 the home subscriber server about filter criteria FC received from mobile terminal UE2. The subscription may comprise a Call Processing Language (CPL) script that can be uploaded to home subscriber server HSS in order to establish correct Filter Criteria (FC).

As soon as filter criteria and service logic are established once by the aforementioned subscription procedure, the information service about missed call events and voice messages is activated and available. That means, as soon as information about missed call events and/or voice messages is present in the voicemail application server VAS and database DB, respectively, the delivery of the information is triggered in accordance with an operation 4a.4; i.e. delivery is suspended until mobile terminal UE2 is present in the public land mobile network for accepting delivery. In an operation 4a.5, voicemail application server VAS requests information about missed call events and/or voice messages from database DB storing the information and voice messages. In an operation 4a.6, the requested information is transmitted by database DB to voicemail application server VAS. As a consequence, the request and voicemail application server VAS sets up a NOTIFY procedure in a next operation 4a.7 comprising the information requested from database DB. The NOTIFY procedure is finally acknowledged in an operation 4a.8 by mobile terminal UE2 with an OK response.

It should be noted that the above-presented subscribe-notify framework could use the subscribe-notify mechanism provided by the SIP. The NOTIFY message of operation 4a.7 could be a SIP NOTIFY message. Moreover, the subscription procedure performed via mobile terminal UE2 has been described in detail. Alternatively, in contrast to the user-definable subscription procedure as aforementioned, the subscription may be a permanent subscription set up by an operator of the PLMN. Instead of the user via mobile terminal UE2 the operator of the PLMN uploads the information required for subscription to voicemail application server which in turn supplies filter criteria to home subscriber server HSS.

It should be further noted that the request for information about missed call events and/or voice messages directed in operation 4a.5 to database DB may be carried out in any suitable protocol that is adapted for requesting information from database DB. In particular, SQL represents an adequate database access protocol but the present invention should not be understood as limited thereto.

Figure 4B:
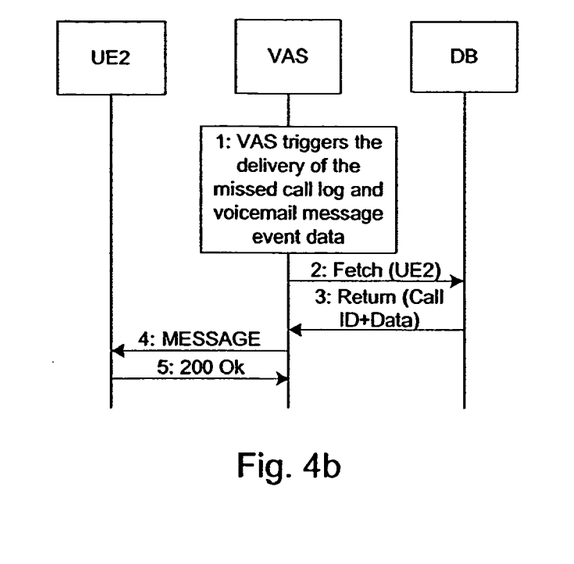
FIG. 4b illustrates a first operational sequence chart that relates to registering of a mobile terminal according to a second embodiment of the invention.
Figure 5:
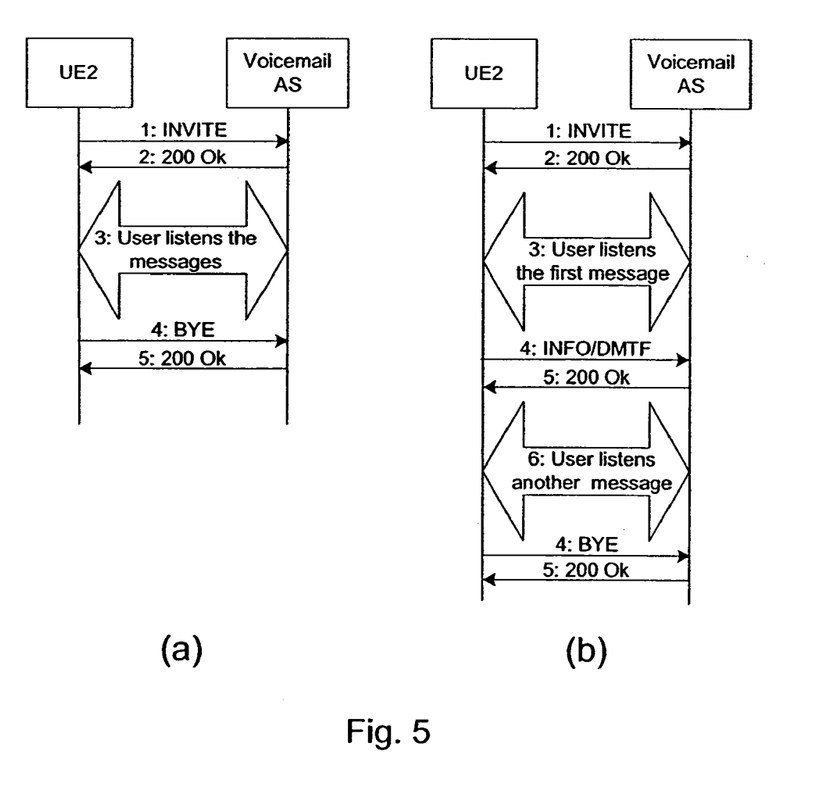

With reference to FIG. 4a, the depicted operational sequence relates to a delivery procedure being modified in comparison with the operational sequence shown in FIG. 4b. In alternative to FIG. 4a the presented operational sequence may employ a SIP MESSAGE procedure to deliver the information.

In detail, as soon as information about missed call events and/or voice messages is present in the voicemail application server VAS and database DB, respectively, the delivery of the information is triggered in accordance with an operation 4b.1; i.e. delivery is suspended until mobile terminal UE2 is present in the public land mobile network for accepting delivery. In an operation 4b.2, voicemail application server VAS requests information about missed call events and/or voice messages from database DB storing the information and voice messages. In an operation 4b.3, the requested information is transmitted by database DB to voicemail application server VAS and, as a consequence the request and voicemail application server VAS sets up a MESSAGE procedure in a next operation 4b.4 comprising the information requested from database DB. The MESSAGE procedure is finally acknowledged in an operation 4b.5 by mobile terminal UE2 with an OK response.

Figure 6:
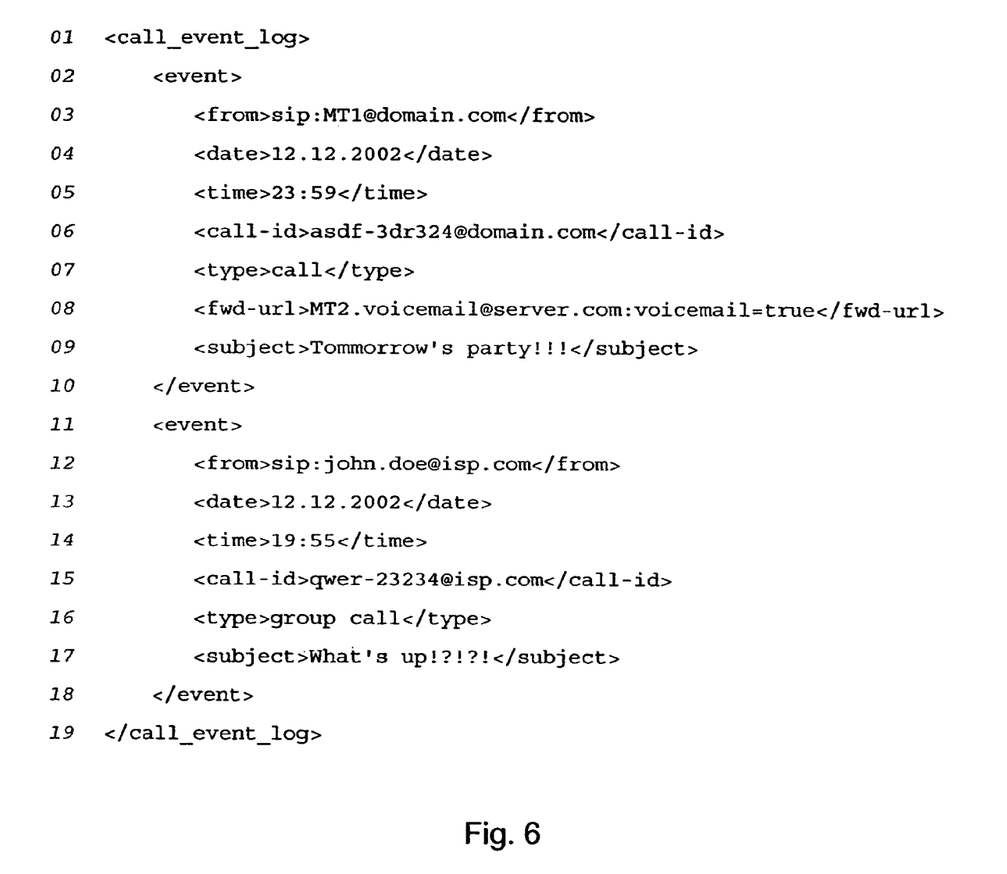
FIG. 6 illustrates an example notification message informing about missed calls and voice messages according to an embodiment of the invention.

An example structuring of the information delivered in a NOTIFY procedure or in a MESSAGE procedure according to FIGS. 4a and 4b, respectively, is illustrated in FIG. 6 and described in detail with respect thereto.

It should be emphasized that the above-presented methods for delivering information about missed call events and/or voice messages are example implementations. The present invention should not be limited to anyone of the specific illustrated and described procedures. Alternative data communication procedures and bearers may be employed without departing from the spirit and scope of the present invention. For example, the information delivery may be based on MMS messages containing plain text or well-structured information. Additionally, an information delivery on the basis of an HTTP POST procedure may also applicable.

The following operational sequences illustrated in FIG. 5a and FIG. 5b relate to the recalling/reproducing of voice messages stored by voicemail application server VAS and database DB, respectively, associated with voicemail application server VAS for storing registered information and voice messages. For simplicity, database DB and operations relating to the requesting and delivering of information, data, voice messages and the like stored in the database DB are omitted. Access procedures to database DB have been explained above with respect to FIGS. 4a and 4b, respectively.

Recalling Voice Messages

Referring to FIG. 5a, the user wants to listen to voice messages stored by voicemail application server VAS. In an operation 5a.1, the user simply calls voicemail application server VAS, which may cause an INVITE request of mobile terminal UE2 to voicemail application server VAS. Voicemail application server VAS acknowledges the INVITE request with an OK response in an operation 5a.2. Now the user may listen in an operation 5a.3 to one or more voice messages stored on and reproduced subsequently by voicemail application server VAS. Finally, the call to voicemail application server VAS is finished by transmitting a BYE indication acknowledged with an OK response, in operations 5a.4 and 5a.5.

In a more sophisticated voice message reproduction, the DTMF-coded signals effected by user input may allow the user to control the reproduction of the one or more voice messages. A corresponding exemplary operational sequence is depicted in FIG. 5b. The control of the reproduction may comprise indicating a pausing of the current reproduction, a resuming of the current reproduction, a skipping forward to a next voice message, a skipping backward to a previous voice message, a winding forward within a voice message, a winding backward within a voice message, a repeated reproduction of a voice message, a deleting of a voice message and the like. The control of the reproduction via voicemail application server VAS may be realized by employing INVITE, UPDATE and INFO procedures/dialogs of the SIP. The UPDATE procedure may be applicable for instructing pausing and resuming, whereas the INFO procedure may be applicable for instructing skipping and winding commands, wherein the INFO procedure may include XML-coded data or DTMF-coded signals for conveying information and commands required. The DTMF coded signals may be substituted with a new SIP procedure that is currently under standardization in the International Engineering Task Force (IETF). This new SIP procedure is capable and adapted to carry DTMF-like commands that are formatted in KeyPad Markup Language (KPML). Thus, the method described in detail above is not limited to DTMF-coded signal conveyance, since alternatives are possible. One alternative is the briefly mentioned KPML-coded signaling.

The establishing of a communication connection to voicemail application server VAS may require an authorization of the user at voicemail application server VAS. For instance an adequate authorization procedure may comprise a transmission of a user identification and/or a password to voicemail application server VAS. Alternatively, the authorization procedure may be based on URI of mobile terminal UE2, which is comprised in dialogs of the SIP.

The most sophisticated voice message reproduction may allow a remote control of the reproduction of the one or more voice messages stored by voicemail application server VAS. When referring back to the user interface presentation of FIG. 1(b), a list of missed call events are shown, each entry of which comprises information about the missed voice event including information whether a voice message has been left by the caller of the missed call. The selecting of the option function "listen to voice message" as illustrated in FIG. 1(c) may automatically establish a communication connection to voicemail application server VAS and instruct voicemail application server VAS to reproduce the voice message of exactly that missed call event that has been pre-selected before selecting the option function "listen to voice message". Such an automatic selection of a voice message on voicemail application server VAS for being reproduced may be obtained by using an INVITE request transmitted from mobile terminal UE2 to voicemail application server VAS, the header of which includes for example a call-ID or XML-formatted data that identifies to voicemail application server VAS the voice message to be reproduced. Voicemail application server VAS receives such an INVITE request, parses the header of the INVITE request and may extract the call-ID and select on the basis of the extracted call-ID a corresponding voice message stored thereon.

Finally, the reproduction of the voice messages may be performed by mobile terminal UE2 itself. Mobile terminal UE2 implements voice message player functionality such that voice messages to be reproduced are downloaded from voicemail application server VAS to mobile terminal UE2 and stored on mobile terminal UE2. Once the one or more voice messages are downloaded and stored, the user may operate the voice message player functionality comprising pause, resume, skipping (forward, backward), winding (forward, backward) etc functions to reproduce a voice message for being listened to. This embodiment allows the user to get complete access to the handling and managing of the voice messages. Once a voice message is downloaded it can be reproduced several times without any further charging, it can be archived, it can be deleted, it can be forwarded etc.

Although the communication between mobile terminal UE2 and voicemail application server VAS has been described in conjunction with dialogs/procedures of the SIP it should be understood that any other protocol may be applicable to implement the aforementioned features. The employed protocol has to be supported on both sides, i.e. on the side of mobile terminal UE2 as well as on the side of voicemail application server VAS. For instance, the communication between mobile terminal UE2 and voicemail application server VAS may be based on Hyper-Text Transfer Protocol (HTTP). The aforementioned DTMF coding for conveying signals may be replaced with KeyPad Markup Language (KPML), Voice extensible Markup Language (VoiceXML), or any other relevant description language.

Protocol for Conveyance of Information about Voice Messages and Missed Call Events The structuring of the delivered information may be carried out according to any specific protocol or may be coded as plain text information. The usage of a specific protocol is preferable in order to put the information to be delivered in a well formed structure that is able to be parsed in an economical way, especially in view of the limited processing capabilities and storage capacities of mobile terminals.

FIG. 6 depicts an exemplary well-formed XML-formatted structure which allows embedding information about missed call events and voice messages. A specific XML decoding application operated on mobile terminal UE2 serves for parsing the XML-formatted structure and extracts the coded information therefrom. The parsable XML-formatted structure guarantees that the comprised information is combinable with missed call events registered, logged and handled by mobile terminal UE2 such that the aforementioned handling of information about missed call events and voice messages is realizable.

The example XML-formatted structure shown in FIG. 6 should not be understood to represent a concluding and completed definition of the XML format. The example XML-formatted structure comprises information about a missed call event with a voice message left on a voicemail application server (cf. lines 02 to 10) and an information about a missed call event (cf. lines 12 to 18).

The information about the missed call event with left voice message of lines 02 to 10 comprises an information about the originator of the missed call event in line 03, a date and time information in lines 04 and 05, a call identifier (call-ID) in line 06, a information about the type in line 07, an address information for obtaining a voice message in line 08 and finally a subject information in line 09.

Analogously, the information about the missed call event of lines 12 to 17 comprises an information about the originator of the missed call event in line 12, a date and time information in lines 13 and 14, a call identifier (call-ID) in line 15, a information about the type in line 16 and finally a subject information in line 17.

The information is well structured due to the XML-formatted structuring. Instead of the presented XML-formatted information VoiceXML could be utilized in the aforementioned application for coding. In fact, VoiceXML should be applicable to represent voice messages as such and to be used as one coding format when voice messages are stored in the mobile terminal itself.

CONCLUSION

While a selection of embodiment of the invention have been disclosed in detail, it should be understood by those skilled in the art that various other modifications and variations may be made to the illustrated embodiments without departing from the spirit and scope of the present invention as described in the specification and defined in the appended claims.

ABBREVIATIONS

3GPP 3rd Generation Partnership Project
ASIC Application Specific Integrated Circuit
CDMA Code Division Multiple Access
CLI Calling Line Identifier
CLIP Calling Line Identification Presentation
CPL Call Processing Language
DB DataBase
DTMF Dual-Tone Multi-Frequency
FC Filter Criteria
GSM Global System for Mobile communication
HSS Home Subscriber Server
HTTP Hyper-Text Transfer Protocol
IETF International Engineering Task Force
IMS IP Multimedia Subsystem
IP Internet Protocol
ISDN Integrated Services Digital Network
ITU-T International Telecommunications Union—Telephony
KPML KeyPad Markup Language
PLMN Public Land Mobile Network
RCAS Rich Call Application Server
RTP Real Time Protocol
S-CSCF Serving Call State Control Function
SIP Session Initiation Protocol
SQL Structured Query Language
UDP User Datagram Protocol
UE User Equipment
UMTS Universal Mobile Telecommunications System
URI Uniform Resource Indicator
VAS Voicemail Application Server
VoiceXML Voice extensible Markup Language
VoIP Voice over IP
XML extensible Markup Language

The invention claimed is:

1. A method comprising:
causing, at least in part, actions that result in reception of network-based information about one or more missed call events, caller identification and one or more voice messages associated with the one or more missed call events registered by a public land mobile network to which a mobile terminal is subscribed, wherein said mobile terminal comprises a registering functionality for registering terminal-based information about one or more missed call events, caller identification and one or more voice messages associated with the one or more missed call events;
combining said network-based information with said terminal-based information; and
causing, at least in part, actions that result in presenting the combined information on one screen at a user interface of said mobile terminal,
wherein said mobile terminal receives said network-based information about missed call events as extensible markup language-coded data from said public land mobile network.

2. The method according to claim 1, wherein the network-based information contains information of a calling time of each of the one or more missed call events, and the terminal-based information contains a calling time of each of the one or more missed call events.

3. The method according to claim 1, comprising instructing a voice mailbox system being part of said public land mobile network to reproduce voice messages stored thereon.

4. The method according to claim 3, comprising instructing said voice mailbox system to reproduce user-selected voice messages, said user-selected voice messages being defined by user selection operable with said mobile terminal.

5. The method according to claim 1, comprising downloading at least one voice message from a voice mailbox system being part of said public land mobile network; and storing said downloaded voice message; wherein said mobile terminal comprises a voice message reproduction functionality for reproducing voice messages.

6. The method according to claim 1, comprising resolving a designation of a caller by a caller identifier comprised in said information about missed call events in accordance with a directory associating designations of callers with caller identifiers.

7. The method according to claim 1, wherein said combining of said information about missed call events and said information about voice messages is obtained by comparing call identifiers.

8. The method according to claim 1, wherein said mobile terminal receives said network-based information about missed call events from a voice mailbox service being part of said public land mobile network.

9. The method according to claim 1, wherein a data communication with said public land mobile network is based on a session initiation protocol.

10. A method comprising:
causing, at least in part, actions that result in reception of an incoming call by an internet protocol multimedia subsystem from a calling terminal originally destined to a called mobile terminal;
redirecting said incoming call in accordance with filter criteria to said internet protocol multimedia subsystem;
registering information about a missed call event in accordance with said incoming call by said internet protocol multimedia subsystem; and
causing, at least in part, actions that result in storage of said registered information by the internet protocol multimedia subsystem.

11. The method according to claim 10, wherein said internet protocol multimedia subsystem comprises one or more call state control functions.

12. The method according to claim 11, comprising: recording voice message dictated by a caller of said calling terminal by a voice mailbox service being part of said public land mobile network; and storing said voice message by said voice mailbox service in association with said registered information about said missed call event.

13. The method according to claim 12, wherein a database is associated with said voice mailbox service Voice Mailbox Service.

14. The method according to claim 10, wherein one functional entity is aware of an availability of said originally destined mobile terminal in said public land mobile network; and further comprising transmitting said registered information to said originally destined mobile terminal, when said originally destined mobile terminal is present in said public land mobile network.

15. The method according to claim 10, wherein said public land mobile network includes an availability function which is responsible to inform third party services subscribed to said availability function about an availability of said called mobile terminal.

16. The method according to claim 15, wherein said voice mailbox service is subscribed to said availability function that indicates said availability of said originally destined mobile terminal thereto.

17. The method according to claim 10, wherein said registered information is transmitted as extensible markup language-coded data to said originally destined mobile terminal.

18. The method according to claim 10, wherein a data communication with said originally destined mobile terminal is based on a session initiation protocol.

19. A computer readable storage medium carrying one or more sequences of one or more instructions which, when executed by one or more processors, cause an apparatus to at least perform the method of claim 1.

20. A computer readable storage medium carrying one or more sequences of one or more instructions which, when executed by one or more processors, cause an apparatus to at least perform the method of claim 10.

21. An apparatus comprising:

at least one processor; and at least one memory including computer program code, the at least one memory and the computer program code configured to, with the at least one processor, cause the apparatus to perform at least the following, cause, at least in part, actions that result in reception of network-based information about one or more missed call events, caller identification and one or more voice messages associated with the one or more missed call events registered by a public land mobile network to which a mobile terminal is subscribed, wherein said mobile terminal comprises a registering functionality for registering terminal-based information about one or more missed call events, caller identification and one or more voice messages associated with the one or more missed call events;

combine said network-based information with said terminal-based information; and cause, at least in part, actions that result in presenting the combined information on one screen at a user interface of said mobile terminal, wherein said mobile terminal receives said network-based information about missed call events as extensible markup language -coded data from said public land mobile network.

22. The apparatus according to claim 21, wherein the network-based information contains information of a calling time of each of the one or more missed call events, and the terminal-based information contains a calling time of each of the one or more missed call events.

23. A network comprising an internet protocol multimedia subsystem which is adapted to receive an incoming call from a calling terminal originally destined to a called mobile terminal and to redirect said incoming call in accordance with filter criteria to register information about a missed call event in accordance with said incoming call and to store said registered information.

24. A network comprising an internet protocol multimedia subsystem which is adapted to receive an incoming call from a calling terminal originally destined to a called mobile terminal and to redirect said incoming call in accordance with filter criteria to register information about a missed call event in accordance with said incoming call and to store said registered information, wherein said public land mobile network is adapted to perform any steps of the method according to claim 10.

25. The apparatus according to claim 21, wherein a data communication with said public land mobile network is based on a session initiation protocol.

* * * * *